United States Patent Office 2,928,858
Patented Mar. 15, 1960

2,928,858

ORGANOSILICON ACYLAMINO COMPOUNDS AND PROCESS FOR PRODUCING THE SAME

Edward L. Morehouse, Snyder, N.Y., assignor to Union Carbide Corporation, a corporation of New York No Drawing. Application October 12, 1956
Serial No. 615,448

14 Claims. (Cl. 260—448.8)

The present invention relates to organosilicon compounds and to processes for their production. More particularly, this invention is concerned with organosilicon compounds containing among other possible functional groups an acylamino group of the type represented by the structural formula:

$$M-\overset{O}{\underset{\|}{C}}-R-\overset{O}{\underset{\|}{C}}-NH- \quad (1)$$

wherein R is an alkylene, arylene or alkenylene group or divalent heterocyclic ring, M is a hydroxyl group, a halogen atom, an OR' group, a $\equiv Si(CH_2)_aNH-$ group 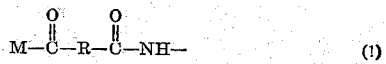
(i.e. when the acylamino group is a $\equiv Si(CH_2)_aNH-\overset{O}{\underset{\|}{C}}-R-\overset{O}{\underset{\|}{C}}-NH$-group) (a) is an integer that has a value of at least 3 and is preferably 3 or 4, and R' is an alkyl or an aryl group, which is linked to a silicon atom through a polymethylene chain containing at least three carbon atoms, as new compositions of matter. The invention is also concerned with processes for producing said organosilicon compounds and with uses thereof.

The present invention is based, in part, upon my discovery that silicon compounds containing an acylamino group of the type represented by structural Formula 1 which is attached to a silicon atom through a polymethylene linkage that contains at least three carbon atoms can be produced by the reaction of at least one organosilicon compound containing at least one aminoalkylsilyl grouping (i.e. a $NH_2(CH_2)_aSi\equiv$ grouping wherein (a) has the abovedescribed meaning) with a dicarboxylic organic acid, a diester of a dicarboxylic organic acid, a dicarboxylic organic acid halide or the anhydride of a dicarboxylic organic acid as represented by the following equations:

$$HOOC-R-COOH+H_2N(CH_2)_aSi\equiv \longrightarrow$$
$$HOOC-R-\overset{O}{\underset{\|}{C}}-NH(CH_2)_aSi\equiv + H_2O \quad (2a)$$

followed by, if desired, $$HOOC-R-\overset{O}{\underset{\|}{C}}-NH(CH_2)_aSi\equiv + H_2N(CH_2)_aSi\equiv \longrightarrow$$
$$\equiv Si(CH_2)_aNH\overset{O}{\underset{\|}{C}}-R-\overset{O}{\underset{\|}{C}}NH(CH_2)_aSi\equiv + H_2O \quad (2b)$$

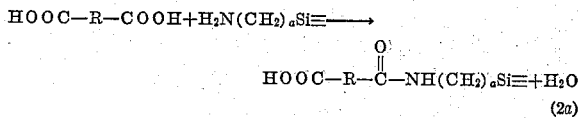
$$G-\overset{O}{\underset{\|}{C}}-R-\overset{O}{\underset{\|}{C}}-G+H_2N(CH_2)_aSi\equiv \longrightarrow G-\overset{O}{\underset{\|}{C}}-R-\overset{O}{\underset{\|}{C}}-NH(CH_2)_aSi\equiv + HG \quad (3a)$$

followed by, if desired,

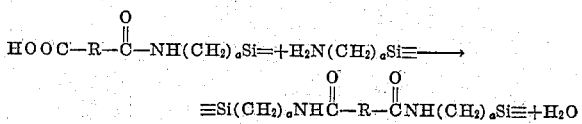
$$G-\overset{O}{\underset{\|}{C}}-R-\overset{O}{\underset{\|}{C}}-NH(CH_2)_aSi\equiv + H_2N(CH_2)_aSi\equiv \longrightarrow$$
$$\equiv Si(CH_2)_aNH\overset{O}{\underset{\|}{C}}-R-\overset{O}{\underset{\|}{C}}-NH(CH_2)_aSi\equiv + HG \quad (3b)$$

$$R'OOC-R-COOR'+H_2N(CH_2)_aSi\equiv \longrightarrow$$
$$R'OOC-R-\overset{O}{\underset{\|}{C}}-NH(CH_2)_aSi\equiv + R'OH \quad (4a)$$

followed by, if desired, $$R'OOC-R-\overset{O}{\underset{\|}{C}}-NH(CH_2)_aSi\equiv + H_2N(CH_2)_aSi\equiv \longrightarrow$$
$$\equiv Si(CH_2)_aNH\overset{O}{\underset{\|}{C}}-R-\overset{O}{\underset{\|}{C}}-NH(CH_2)_aSi\equiv + R'OH \quad (4b)$$

$$R(CO)_2O+H_2N(CH_2)_aSi\equiv \longrightarrow HOOC-R-\overset{O}{\underset{\|}{C}}-NH(CH_2)_aSi\equiv \quad (5a)$$

following by, if desired, $$HOOC-R-\overset{O}{\underset{\|}{C}}-NH(CH_2)_aSi\equiv + H_2N(CH_2)_aSi\equiv \longrightarrow$$
$$\equiv Si(CH_2)_aNH\overset{O}{\underset{\|}{C}}-R-\overset{O}{\underset{\|}{C}}NH(CH_2)_aSi\equiv + H_2O \quad (5b)$$

wherein R, R' and (a) have the above-defined meanings and G is a halogen atom.

According to my studies the reation represented by Equation 1 is a general one and is applicable to all organosilicon compounds which contain the aminoalkylsilyl grouping depicted above. Suitable for use in my process are the aminoalkylalkoxysilanes and the aminoalkylpolysiloxanes, including copolymeric materials which contain both aminoalkylsiloxane and hydrocarbylsiloxane units.

Typical of the aminoalkylalkoxysilanes suitable for use as my organosilicon starting materials are those compounds represented by the structural formula:

$$H_2N(CH_2)_a\overset{R''_b}{\underset{|}{Si}}X_{(3-b)} \quad (6)$$

wherein R'' represents an alkyl group such as the methyl, ethyl, propyl and butyl groups and the like, or an aryl group such as the phenyl, naphthyl and tolyl groups or an aralkyl group such as a benzyl group and the like, X represents an alkoxy group such as the methoxy, ethoxy, propoxy groups, 2-ethylhexoxy group and the like, (a) is an integer having a value of at least 3 and preferably a value of from 3 to 4 and (b) is an integer having a value of from 0 to 2 and preferably a value of from 0 to 1. Illustrative of such aminoalkylalkoxysilanes are gamma-aminopropyltriethoxysilane, gamma-aminopropylmethyldiethoxysilane, gamma-aminopropylethyldiethoxysilane, gamma - aminopropylphenyldiethoxysilane, delta-aminobutyltriethoxysilane, delta-aminobutylmethyldiethoxysilane, delta-aminobutylethyldiethoxysilane, delta-aminobutylphenyldiethoxysilane and the like.

Typical of the aminoalkylpolysiloxanes suitable for use as my organosilicon starting materials are those polysiloxanes which contain the structural unit:

$$H_2N(CH_2)_a\overset{R''_b}{\underset{|}{Si}}O_{\frac{3-b}{2}} \quad (7)$$

wherein R'', (a) and (b) have the same values described above. Such polysiloxanes are prepared by the hydrolysis and condensation of those aminoalkylalkoxysilanes described above or by the cohydrolysis and cocondensation of such aminoalkylalkoxysilanes with other hydrolyzable silanes and can include aminoalkylpolysiloxanes of the trifunctional variety (i.e. where $b=0$), aminoalkylalkylpolysiloxanes and aminoalkylarylpolysiloxanes of the difunctional variety which include cyclic or linear polysiloxanes (i.e. where $b=1$) and linear aminoalkyldialkyldisiloxanes, aminoalkyldiaryldisiloxanes and aminoalkylalkaryldisiloxanes of the monofunctional variety (i.e. where $b=2$) as well as the mixture of compounds produced by the cohydrolysis of difunctional and trifunctional aminoalkylalkoxysilanes.

Suitable starting aminoalkylpolysiloxanes of the trifunctional variety can be more specifically depicted as containing the structural unit:

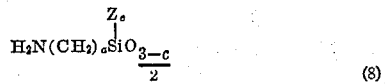
(8)

wherein ($a$) has the value previously described, Z represents an hydroxyl and/or alkoxy group and ($c$) has an average value of from 0 to 1 or as high as 2 but preferably from 0.1 to 1.0. Aminoalkylpolysiloxanes of this variety which are essentially free of silicon-bonded alkoxy or hydroxyl groups (i.e. where $c=0$) can be prepared by the complete hydrolysis and complete condensation of aminoalkyltrialkoxysilanes, whereas aminoalkylpolysiloxanes which contain silicon-bonded alkoxy groups can be prepared by the partial hydrolysis and complete condensation of the same starting silanes. On the other hand, aminoalkylpolysiloxanes which contain silicon-bonded hydroxyl groups can be prepared by the complete hydrolysis and partial condensation of the same aminoalkyltrialkoxysilanes. By way of illustration, a gamma - aminopropylpolysiloxane containing silicon-bonded ethoxy groups can be prepared by hydrolyzing gamma-aminopropyltriethoxysilane with an amount of water insufficient to react with all of the silicon-bonded ethoxy groups present on the starting silane and subsequently condensing the hydrolyzate so formed to produce the desired polymer.

Suitable starting aminoalkylpolysiloxanes of the difunctional variety which include cyclic and linear polysiloxanes can be more specifically defined by the structural formula:

(9)

wherein $R''$ and ($a$) have the values previously described and ($d$) is an integer having a value of at least 3 and can be as high as 7 for the cyclic aminoalkylpolysiloxanes and higher for the linear aminoalkylpolysiloxanes. Such cyclic and linear aminoalkylpolysiloxanes can be prepared by the hydrolysis and condensation of aminoalkylalkyldiethoxysilanes or aminoalkylaryldiethoxysilanes. In carrying out the hydrolysis and condensation procedures there is produced a product containing a mixture of cyclic and linear polysiloxanes from which the desired polysiloxane can be recovered. Illustrative of the cyclic aminoalkylsiloxanes suitable for use as the organosilicon starting material in my process are the cyclic tetramer of gamma-aminopropylmethylsiloxane, the cyclic tetramer of delta-aminobutylphenylsiloxane and the like. Illustrative of linear aminoalkylpolysiloxanes suitable for use as the organosilicon starting material in my process are gamma-aminopropylmethylpolysiloxane, gamma-aminopropylethylpolysiloxane, delta-aminobutylmethylpolysiloxane and the like.

Included among the linear aminoalkylpolysiloxanes suitable for use as the organosilicon starting material in my process are the alkyl, alkoxy and hydroxyl end-blocked polysiloxanes which contain from 1 to 3 of such groups bonded to the terminal silicon atoms of the molecules comprising the polymeric chains. Thus I can also employ as my starting materials such linear end-blocked aminoalkylpolysiloxanes as monoethoxy end-blocked gamma-aminopropylethylpolysiloxane or methyldiethoxysilyl end-blocked delta-aminobutylmethylpolysiloxane or monoethoxydimethylsilyl end-blocked gamma-aminopropylphenylpolysiloxane and the like. The end-blocked linear aminoalkylalkylpolysiloxanes and aminoalkylaryl-polysiloxanes useful in my process can be prepared by the equilibration of cyclic aminoalkylsiloxanes with silicon compounds containing predominantly silicon-bonded alkoxy groups, or by the cohydrolysis and condensation of trialkylalkoxysilanes with aminoalkylalkyldiethoxysilanes, or aminoalkylaryldiethoxysilanes. Hydroxyl endblocked linear polysiloxanes can also be prepared by heating linear or cyclic aminoalkylpolysiloxanes with water.

The copolymeric aminoalkylpolysiloxanes which can be employed as starting materials can be depicted as containing both the structural units:

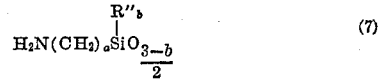
(7)

and

(10)

wherein $R''$, ($a$) and ($b$) have the values described above and ($e$) is an integer having a value of from 0 to 2. The copolymers suitable for use as the organosilicon starting material in my process can contain various combined siloxane units such as trifunctional aminoalkylsiloxane units (where $b=0$) with trifunctional alkyl-, aryl- or mixed alkyl- and arylsiloxane units (where $e=0$) or with difunctional alkyl-, aryl-, or mixed alkyl- and arylsiloxane units (where $e=1$). These copolymers can also contain various combined siloxane units; difunctional aminoalkylsiloxane units (where $b=1$) with trifunctional alkyl-, aryl- or mixed alkyl- and arylsiloxane units (where $e=0$) or with difunctional alkyl-, aryl, or mixed alkyl- and arylsiloxane units (where $e=1$).

Those copolymers which contain trifunctional aminoalkylsiloxane units and other siloxane units are preferably prepared by the cohydrolysis and cocondensation of the corresponding alkoxysilane starting materials. Such copolymers can contain silicon-bonded alkoxy or hydroxyl groups or they can comprise essentially completely condensed materials. The linear and cyclic copolymeric siloxanes are preferably prepared by the separate hydrolysis and condensation of an aminoalkylalkyldialkoxysilane or aminoalkylaryldialkoxysilane and the dialkyldialkoxysilane or diaryldialkoxysilane to cyclic aminoalkylsiloxanes and cyclic dialkylsiloxanes or diarylsiloxanes and subsequently equilibrating mixtures of such cyclic siloxanes to linear copolymers. Such linear copolymers can also contain chain-terminating or endblocking groups such as alkyl, alkoxy or hydroxyl groups. The equilibration will also produce some copolymeric cyclic siloxanes.

The aminoalkylalkoxysilanes and aminoalkylpolysiloxanes as well as copolymers containing aminoalkylsiloxane and hydrocarbylsiloxane units are all disclosed and claimed as new compositions of matter in copending U.S. application Serial Nos. 615,466; 615,481, now abandoned, 615,483, now abandoned, and 615,507, filed concurrently herewith. Processes for producing such compounds are also disclosed and claimed in said copending applications.

We have found that the reactions represented by Equations 2a through 5b are generally applicable to all dicarboxylic organic acids and the acid halide, di-ester and anhydride derivatives thereof. These compounds are organic dicarbonyl compounds that may be represented by the structural formula:

(11)

wherein $M'$ is $(OH)_2$ (i.e. when $R(CO)_2M'$ is a dicarboxylic acid), $G_2$ where G is a halogen atom (i.e. when $R(CO)_2M'$ is the acid halide of a dicarboxylic acid), $(OR')_2$ where $R'$ is an alkyl or an aryl group (i.e. when $R(CO)_2M'$ is a 2 di-ester of a dicarboxylic acid) or an oxygen atom (i.e. when $R(CO)_2M'$ is the anhydride of a dicarboxylic organic acid and R has the above-defined meaning. These organic dicarbonyl compounds that are useful as starting materials in producing the compositions of this invention are depicted more specifically in structural Formulae 12 through 15 below.

Typical of the dicarboxylic organic acids that are useful as starting materials in producing the compositions of this invention are those compounds represented by the structural formula:

HOOCRCOOH    (12)

wherein R is an alkylene group, an alkenylene group, an arylene group or a divalent heterocyclic ring. The latter-mentioned divalent heterocyclic rings represented by R may contain carbon and at least one other element such as nitrogen, oxygen or sulfur. The groups and rings represented by R in these starting materials may contain such substituents as one or more nitro groups, halogen atoms, alkoxy groups, cyano groups, amino groups, hydrocarbylthio (e.g. methylthio, $CH_3S-$) groups, the above-mentioned divalent heterocyclic rings and the like. Illustrative of these acids are oxalic acid, saturated aliphatic dicarboxylic acids such as succinic, malonic, adipic and sebacic acids and the like, olefinically unsaturated dicarboxylic acids such as maleic, fumaric, and 1-decene-1,10-dicarboxylic acids and the like, dicarboxy substituted aromatic compounds such as ortho-, meta- and para-phthalic acids, the isomeric dicarboxy substituted naphthalenes and the like, dicarboxy substituted heterocyclic ring compounds such as quinolinic acid, and the like. I prefer to use as starting materials dicarboxylic organic acids that may be represented by structural Formula 12 wherein R is an alkylene or an alkenylene group that contains from 1 to 12 or as high as 20 carbon atoms or a phenylene group.

Typical of the di-esters of dicarboxylic organic acids that are useful as starting materials in producing the compositions of this invention are those compounds represented by the structural formula:

R'OOCRCOOR'    (13)

wherein R' and R have the above-defined meanings. These esters may be considered as derivatives of the acids represented by structural Formula 12. Illustrative of these esters are dimethyl oxalate, alkyl and aryl esters of saturated aliphatic dicarboxylic acids such as diethyl succinate, diphenyl malonate, ditolyl adipate and the like, alkyl and aryl esters of olefinically unsaturated dicarboxylic acids such as diethylmaleate, diphenyl fumarate, and the like, dicarbalkoxy and dicarbaryloxy substituted-benzene and naphthalene compounds such as dioctyl phthalate and the isomeric dicarbophenoxy naphthalenes. I prefer to use as starting materials esters of dicarboxylic organic acids that may be represented by structural Formula 13 wherein R is an alkylene or an alkenylene group that contains from 1 to 12 or as high as 20 carbon atoms or a phenylene group and R'' is a lower alkyl or a phenyl group.

Typical of the dicarboxylic organic acid halides that are useful as starting materials in producing the compositions of this invention are those compositions represented by the structural formula:

    (14)

wherein R has the above-defined meaning and G is a halogen atom. These acid halides may be considered as derivatives of the acids represented by the structural Formula 12. Illustrative of these acid halides are the acid halides of oxalic acid, the acid halides of saturated aliphatic dicarboxylic acids such as the acid chloride of malonic acid

and the like. The acid halides of aliphatically unsaturated dicarboxylic acids such as the acid chloride of maleic acid

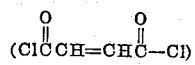

and the like, the acid halides of dicarbalkoxy and dicarbaryloxy substituted benzene and naphthalene compounds such as the acid chlorides of the isomeric phthalic acids

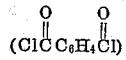

and the like. I prefer to use as starting materials acid halides that are represented by structural Formula 14, wherein R is an alkylene group that contains from 1 to 12 or as high as 20 carbon atoms or an alkenylene group that contains from 2 to 12 carbon atoms or as high as 20 carbon atoms, or a phenylene group, and G is a bromine atom or more preferably a chlorine atom.

Typical of the anhydrides of dicarboxylic organic acids that are useful as starting materials in producing the compositions of this invention are those compositions that are represented by the structural formula:

$R(CO)_2O$    (15)

wherein R has the above-defined meaning. These anhydrides may be considered as derivatives of the acid represented by the structural Formula 12. Illustrative of these anhydrides are the anhydride of oxalic acid, the anhydride of saturated aliphatic dicarboxylic acids such as the anhydride of succinic, maleic and adipic acids and the like, the anhydrides of olefinically unsaturated dicarboxylic acids such as maleic anhydride and the like, the anhydrides of dicarboxy-substituted aromatic compounds such as the isomeric phthalic anhydrides and the anhydrides of dicarboxy-substituted heterocyclic ring compounds. I prefer to use as starting materials anhydrides of dicarboxylic organic acids that may be represented by the structural Formula 15 wherein R is an alkylene group that contains from 1 to 12 or as high as 20 carbon atoms, an alkenylene group that contains from 2 to 12 or as high as 20 carbon atoms or a phenylene group.

I may also use as starting materials in producing the compositions of this invention derivatives of the compounds represented by the structural Formula 12 wherein one of the carboxy groups has been reacted with the aminoalkylsilyl grouping of an organosilicon compound to produce an acylaminoalkylsilyl grouping, derivatives of the diesters of dicarboxylic organic acids represented by structural Formula 13 wherein one of the COOR groups of the ester has been reacted with an aminoalkylsilyl grouping of an organosilicon compound to produce an acylaminoalkylsilyl grouping, derivatives of the dicarboxylic organic acid halides represented by structural Formula 14 wherein one of the —COG groups of the acid halide has been reacted with the aminoalkylsilyl grouping of an organosilicon compound to produce an acylaminoalkylsilyl grouping and derivatives of the anhydrides of dicarboxylic acids represented by structural Formula 15, which derivatives are produced by reacting the anhydrides with an organosilicon compound that contains an aminoalkylsilyl grouping and producing the derivative which contains an acylaminoalkylsilyl grouping and a carboxyl group.

It is often preferable to use derivatives of organic acids, rather than the organic acids themselves, as starting materials in producing the compositions of this invention. One reason for this preference is the formation of salts as intermediates when organic acids are used. These salts are converted to the compositions of this invention but, since these salts are often solids, processing difficulties, such as the need for agitation to suspend the solid salts, are encountered. Conversely, when the organic starting material is unsaturated, I prefer to use alpha-beta olefinically unsaturated dicarboxylic organic acids as starting materials rather than the diester acid halide and anhydride derivatives thereof. It was found that rather than undergoing the desired reaction to form an amide, the aminoalkylsilicon compounds used as reactants often added to the double bond of derivatives of alpha-beta olefinically unsaturated dicarboxylic organic acids. Processes that involve addition reactions as well as compounds produced by these processes are described and claimed in the copending U.S. patent application 615,480, filed concurrently herewith. Alpha-beta olefinically unsaturated dicarboxylic organic acids react with organosilicon compounds containing the aminoalkylsilyl grouping to form compounds of this invention.

The process of my invention can be carried out by forming a mixture of an organosilicon compound containing the aminoalkylsilyl grouping depicted above with a dicarboxylic organic acid, a diester of a dicarboxylic organic acid, a dicarboxylic organic acid halide or the anhydride of a dicarboxylic organic acid and maintaining the mixture at a temperature at which the organosilicon compound and the dicarboxylic organic acid, a diester of a dicarboxylic organic acid, a dicarboxylic organic acid halide or the anhydride of a dicarboxylic organic acid react to produce an organosilicon compound containing an acylamino group the nitrogen atom of which is attached to a silicon atom by a polymethylene chain containing at least three carbon atoms.

The relative amounts of the organosilicon compounds containing the aminoalkylsilyl grouping and the acids or derivatives thereof (i.e. a dicarboxylic organic acid, a diester of a dicarboxylic organic acid, a dicarboxylic organic acid halide or the anhydride of a dicarboxylic organic acid) used as starting materials in our process are not narrowly critical. I can employ for each gram atom of nitrogen present in our starting organosilicon compound from 1 to 10 chemical equivalents (based on the carbonyl groups present in the —COOH group of the acid, or in the —COG group of the acid halide, or in the COOR group of the ester, or in the —COOOC— group of the anhydride) of the starting acid or derivative thereof. However, an excess of the acid or derivative thereof used as a starting material is not desirable unless the unreacted portion of the acid or derivative thereof can be readily removed from the reaction mixture at the completion of the desired reaction (e.g. when a volatile dicarboxylic organic acid is used as a starting material). I prefer to employ for each gram atom of nitrogen present in our starting organosilicon compound one chemical equivalent (based on the carbonyl groups present in the —COOH group of the acid, or in the —COG group of the acid halide, or in the COOR group of the ester, or in the —COOOC— group of the anhydride) of the starting acid or derivative thereof. Relative amounts of our starting materials other than those described can be employed; however, no commensurate advantage is gained thereby.

The reaction between our starting compounds can be carried out at temperatures which are not narrowly critical and which can vary over a wide range. I can employ temperatures of from as low as 0° C. to temperatures as high as 300° C.; however, we prefer to conduct the reaction at temperatures of from about 25° C. to about 150° C. Other temperatures may be used but no commensurate advantage is gained thereby. At temperatures below about 0° C. the rate of the reaction is extremely slow and at temperatures above 300° C. undesirable side reactions tend to occur.

The reaction between organosilicon compounds containing the aminoalkylsilyl grouping and the acid or derivatives thereof is preferably carried out with a liquid organic compound in which the starting materials are mutually soluble and which is non-reactive therewith.

When aminoalkylalkoxysilanes are used as starting materials in producing the compositions of this invention the liquid organic compound within which the reaction represented by Equation 1 may be conducted is preferably a compound that is miscible with water. The use of a liquid organic compound that dissolves the aminoalkylalkoxysilane and acid or acid anhydrides starting materials that is miscible with water was found to minimize the hydrolysis of the alkoxy groups of the aminoalkylalkoxysilane starting material by the water produced in the reaction of the aminoalkylalkoxysilane and the acid or acid anhydride as represented by Equation 1. Illustrative of such liquid organic compounds are cyclic ethers such as tetrahydrofuran and compound that are represented by the formula $R'''O(CH_2CH_2O)_xR'''$ wherein $R'''$ is an alkyl group, or a hydrogen atom that contains from 1 to 4 carbon atoms and $x$ is an integer that has a value of from 1 to 2.

When aminoalkylpolysiloxanes are used as starting materials in producing the compounds of this invention, the liquid organic compound within which the reaction represented by Equation 1 may be conducted is preferably one that is not miscible with water. Liquid organic compounds of the latter type are particularly useful in separating water from the reaction mixture. Illustrative of these liquid organic compounds are petroleum ether and aromatic hydrocarbons such as benzene, toluene and xylene.

When producing the compositions of this invention it is often advantageous to remove the non-silicon containing compound that my be produced along with the compositions of this invention continuously from the reaction mixture.

Pressures lower than atmospheric pressure may be used to aid in the removal of non-silicon containing compounds produced along with the compositions of this invention continuously from the reaction mixture. This method is especially effective in removing the hydogen halides produced when acid halides are used as reactants.

When dicarboxylic organic acids are used as starting materials in producing the compositions of this invention, water is the non-silicon containing compound produced along with the compositions of this invention. This water may be removed from the reaction mixture by adding a liquid organic compound which forms an azeotrope with water to the reaction mixture and then heating the reaction mixture to a temperature sufficiently elevated to volatilize the azeotrope. The volatilized azeotrope may be condensed, the condensate freed of water to produce and anhydrous liquid organic compound and the anhydrous liquid organic compound may be returned to the reaction mixture. Liquid organic compounds which form azeotropes with water that are useful in removing the water formed along with the compositions of this invention are benzene, toluene, xylene and the like.

The amount of the liquid organic compound, that forms an azeotrope with the water formed when producing the compositions of this invention, used in my process is not narrowly critical. Amounts of the liquid organic compounds from 10 parts to 500 parts by weight per 100 parts by weight of the organosilicon compound that contains the aminoalkylsilyl grouping and the dicarboxylic organic acid used as starting materials are useful but amounts of the liquid organic compounds of from 20 parts to 100 parts by weight per 100 parts by weight of the organosilicon compound that contains the aminoalkylsilyl grouping and the dicarboxylic organic acid used as starting materials are preferred. Other amounts of the liquid organic compounds may be used but no commensurate advantage is gained thereby.

Hydrophilic absorbents and absorbents such as silica gel and activated alumina may be added to the reaction mixture to remove the water.

When dicarboxylic organic acid halides are used as starting materials in producing the compositions of this invention, tertiary amines, such as pyridine, quinoline, and the like may be added to the reaction mixture.

These tertiary amines continuously remove the hydrogen halides from the reaction mixtures as they are formed by combining with them to form inert salts. It is desirable to remove these hydrogen halides because they tend to catalyze or act as reactants in undesirable side reactions. Amounts of these tertiary amines of from 1 to 10 times the amount stoichiometrically required to combine with the hydrogen halide to form a salt are useful but amounts of these amines of from 1 to 1.5 times the amount stoichiometrically required to combine with the hydrogen halide are preferred. The amount of the tertiary amine used is not narrowly critical provided that at least the stoichiometric amount is used, and so other amounts may be used but no commensurate advantage is gained thereby.

When diesters of dicarboxylic organic acids are used as starting materials in producing the compositions of this invention alcohols or phenols are produced along with the compositions of this invention. These alcohols and phenols may be removed from the reaction mixtures used in producing the compositions of this invention. Thus the alcohols may be removed by heating the reaction mixture to a temperature sufficiently elevated to volatilize the alcohol.

The compounds of this invention are organosilicon compounds that contain an acylamino group which is linked to a silicon atom through a polymethylene chain containing at least 3 carbon atoms. As used herein, the acylamino group is a group that is represented by the structural formula:

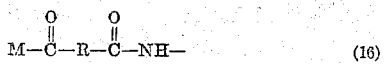  (16)

wherein M and R have the above-defined meaning. The compounds of this invention contain the acylaminoalkylsilyl grouping. This acylaminoalkylsilyl grouping may be represented by the structural formula:

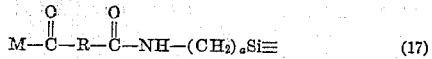  (17)

wherein M, R and $(a)$ have the above-defined meanings. The compounds of this invention that are produced from the aminoalkylalkoxysilanes that are represented by structural Formula 6 and the dicarboxylic organic acids and derivatives thereof represented by structural Formula 11 are acylaminoalkylalkoxysilanes that may be represented by the structural formula:

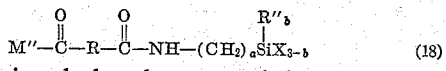  (18)

wherein. M″ is a hydroxyl group, a halogen atom, an OR′ group or a

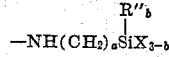

group and R, $(a)$, R″, $(b)$ and X have the above-defined meanings. Illustrative of these acylaminoalkylalkoxysilanes are delta-(alphacarbethoxyacetylamino)butyl - methyldiethoxysilane, delta-(alphacarbethoxyacetylamino) - butyldimethylethoxysilane, gamma-(alphacarbethoxyacetylamino)-propylphenoldipropoxysilane and the like. In the production of these silanes of my invention some or all of the silicon-bonded alkoxy groups of the silanes used as starting materials may hydrolyze to form hydroxyl groups or siloxane bonds. Such hydrolysis reactions are due to the presence of water in these reaction mixtures and the silanols of this invention so produced may be represented by structural Formula 12 wherein R, $(a)$, R″, $(b)$ and M″ have the above-defined meanings, X is an alkoxy group or a hydroxyl group and at least one group represented by X is a hydroxyl group.

The compounds of this invention that are produced from the aminoalkylpolysiloxanes that contain the structural units represented by structural Formula 7 and the dicarboxylic organic acids and derivatives thereof represented by structural Formula 11 are acylaminoalkylpolysiloxanes that contain the structural unit that may be represented by the structural formula:

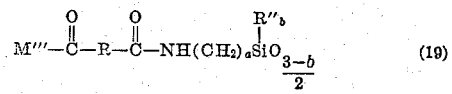  (19)

wherein R, $(a)$, R″ and $(b)$ have the above-defined meanings and M‴ is a hydroxyl group, halogen atom, OR′ group or a

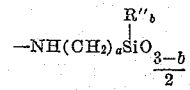

group. Illustrative of these units are the gamma-(alpha-carbethoxyacetylamino)propylsiloxane unit, the gamma-(alpha-carbethoxyacetylamino)propylphenylsiloxane unit, the gamma-(alpha-carbethoxyacetylamino)propylphenylmethylsiloxane unit and the like. When the group represented by M‴ is a

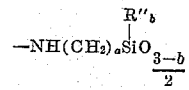

group the compounds of this invention may be copolymers containing alternating siloxane and organic units. By way of illustration, when adipic acid and (gamma-aminopropyldimethylsiloxy)gamma - aminopropyldimethylsilane are used as starting materials in my process, copolymers containing repeating units that may be represented by the following structural formula may be produced:

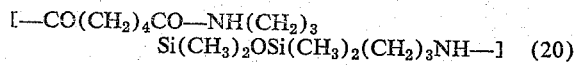  (20)

The compounds of this invention that are produced from the aminoalkylpolysiloxanes that contain the structural unit represented by structural Formula 8 and the dicarboxylic organic acids and derivatives thereof represented by structural Formula 11 are acylaminoalkylpolysiloxanes that contain the structural unit that may be represented by the structural formula:

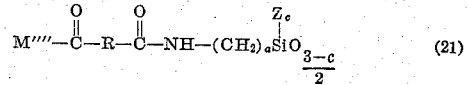  (21)

wherein R, $(a)$, Z and $(c)$ have the above-defined meanings and M″″ is a hydroxyl group, a halogen atom, an OR′ group or a

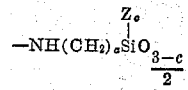

group. Illustrative of these units are gamma-(alpha-carbethoxyacetylamino)propylhydroxysiloxane unit, the gamma - (alpha - carbethoxyacetylamino)propylethoxyphenylsiloxane unit and the like. The compounds of this invention that are produced from the copolymeric aminoalkylpolysiloxanes that contain the structural units represented by structural Formulae 7 and 10 and the dicarboxylic organic acids and derivatives thereof represented by structural Formula 11 are copolymeric acylaminoalkylpolysiloxanes that contain the structural units represented by structural Formulae 10 and 19.

The compounds also find use as additives for known silicone products. By way of illustration the difunctional acylaminoalkylsiloxanes can be either added to or equilibrated with dimethylpolysiloxanes to form modified oils or gums. The trifunctional acylaminoalkylsiloxanes can be employed themselves as thermosetting resins or they can be added to methylphenylpolysiloxanes of the thermosetting type as modifiers. Such thermosetting resins find use as coating materials.

Compounds of this invention may be used as sunscreen agents to protect human skin from the harmful ultra-violet rays of the sun. Compounds of this invention may be used as emulsifying agents in systems containing water and a water-immiscible liquid organic compound. Other uses of these compounds are as lubricating agents.

The following examples are illustrative of my invention:

*Example I*

To a 500 cc. flask that was equipped with a stirrer were added 100 grams (0.076 gram-atom of nitrogen) of a polymer containing 10 parts by weight of combined delta-aminobutylmethylsiloxy groups per 100 parts by weight of the polymer. The polymer was an oil that had a molecular weight of 1000 and a viscosity of 13 centistokes at 25° C. Five and five-tenths grams (0.038 mole) of adipic acid were added to the flask. The acid was insoluble in the oil at room temperature but dissolved and water was formed when the flask was heated with stirring to 200° C. A solution was obtained. The solution was cooled to room temperature, 100 cc. of xylene were added to the flask and 1.2 cc. of water was removed by distillation at 130–160° C. The amount of water that would have been produced theoretically if the reaction had gone to completion was 1.37 cc. The remaining xylene was removed by heating the flask at subatmospheric pressure and up to 100° C. while bubbling argon through the contents of the flask. The product was a very viscous yellow liquid that had a viscosity of 100,000 centistokes at 25° C., contained 1.2% by weight of nitrogen and had infra-red absorption characteristic of the

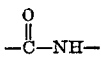

group. The product was a copolymer that contained dimethylsiloxane units and combined units that may be represented by the structural formula:

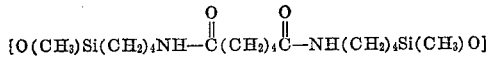

*Example II*

To a 500 cc. flask equipped with stirrer were added delta-aminobutylmethyldiethoxysilane (75 grams, 0.37 mole) and dimethylterephthalate (35.6 grams, 0.185 mole). The latter was insoluble. The reactants were heated to 150° C., at which temperature the mixture became a homogeneous liquid. During the heating 2–4 grams of alcohol distilled leaving a material in the flash which became a white solid on cooling. This solid was heated at 230° C.. for 1 hour, during which period an additional 12 grams of alcohol were distilled. Thus the total amount of alcohol distilled was 14–16 grams. The calculated amount of methanol that would have been produced had the reaction to form acylamino groups gone to completion was 12 grams. The final reaction product (residue in the flask) was a viscous, colorless liquid that gave the following analysis:

Calculated for $C_{26}H_{48}Si_2N_2O_6$ (percent by wt.): N, 5.2; Si, 10.4. Found (percent by wt.): N, 5.2; Si, 10.7.

The residue showed infra-red absorption characteristic of the

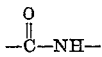

group. The residue was a compound that may be represented by the structural formula:

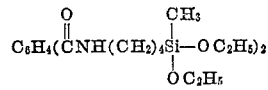

*Example III*

Into a 500 cc. flask that was fitted with a mechanical stirrer, a reflux condenser and a thermometer were placed a delta-aminobutylmethylsiloxane cyclic tetramer (102.7 grams, 0.78 gram-atom of N) and diethyl maleate (86.1 grams, 0.50 mole). During the addition the temperature of the liquid contents of the flask rose to 85° C. The solution was heated over a period of one hour at reduced pressure to a maximum temperature of about 150° C. During the period, 20 grams of liquid were distilled. No silicon-containing distillate was produced. The infra-red analysis of the product remaining in the flask showed strong absorption characteristic of the group

The residue was a compound that may be represented by the structural formula:

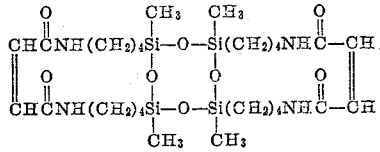

*Example IV*

One hundred grams of gamma-aminopropyltriethoxysilane and 22.4 grams maleic anhydride were stirred together at 25–30° C. This liquid was heated at reduced pressure in a stream of argon to a maximum temperature of 80° C. Two and one-half grams of liquid were volatilized. The undistilled product in the flask was a liquid with a viscosity of 3200 centipoises at 25° C. Infra-red analysis of the product showed absorption characteristic of the

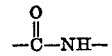

group.

Calculated for $C_{22}H_{46}Si_2N_2O_8$ (percent by wt.): Si, 10.7; N, 5.3. Found (percent by wt.): Si, 10.6; N, 4.8. The product contained a pound of the following structure:

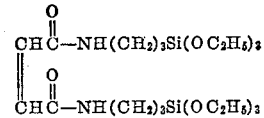

What is claimed is:

1. An organosilicon acylamino compound selected from the group consisting of (1) silanes represented by the formula:

wherein M″ is a member selected from the group consisting of the hydroxyl group, the halogen atoms, the OR′ groups, and the

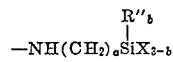

groups, R′ is a member selected from the group consisting of the aryl groups and the alkyl groups, R is a member selected from the group consisting of the alkylene groups, the arylene groups, the alkenylene groups and the divalent heterocyclic rings, said heterocyclic rings being composed of carbon and at least one member selected from the group consisting of the oxygen, sulfur and nitrogen atoms, R″ is a member selected from the group consisting of the aryl groups, the alkyl groups and the aralkyl groups, X is an alkoxy group, *a* is an integer that has a value of at least 3 and *b* is an integer that has a value from 0 to 2, and (2) siloxanes containing at least one group represented by the formula:

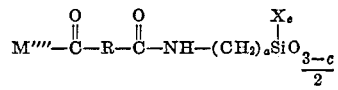

wherein *c* has a value from 0.1 to 1.0, M″″ is a member selected from the group consisting of the halogen atoms and the OR' groups and X, R, R' and $a$ have the above-defined meanings.

2. A silane represented by the formula:

$$M''-\overset{O}{\overset{\|}{C}}-R-\overset{O}{\overset{\|}{C}}-NH-(CH_2)_a\overset{R''_b}{\underset{|}{Si}}X_{3-b}$$

wherein $M''$ is a member selected from the group consisting of the hydroxyl group, the halogen atoms, the OR' groups, and the $$-NH(CH_2)_a\overset{R''_b}{\underset{|}{Si}}X_{3-b}$$

groups, R' is a member selected from the group consisting of the aryl groups and the alkyl groups, R is a member selected from the group consisting of the alkylene groups, the arylene groups, the alkenylene groups and the divalent heterocyclic rings, said heterocyclic rings being composed of carbon and at least one member selected from the group consisting of the oxygen, sulfur and nitrogen atoms, R'' is a member selected from the group consisting of the aryl groups, the alkyl groups and the aralkyl groups, X is an alkoxy group, $a$ is an integer that has a value of at least 3 and $b$ is an integer that has a value from 0 to 2.

3. The silane of claim 2 wherein $M''$ is a hydroxyl group, $a$ has a value from 3 to 4 and $b$ has a value from 0 to 1.

4. The silane of claim 2 wherein $M''$ is a halogen atom, $a$ has a value from 3 to 4 and $b$ has a value from 0 to 1.

5. The silane of claim 2 wherein $M''$ is an OR' group, $a$ has a value from 3 to 4 and $b$ has a value from 0 to 1.

6. The silane of claim 2 wherein $M''$ is a $$-NH(CH_2)_a\overset{R'_b}{\underset{|}{Si}}X_{3-b}$$

group, $a$ has a value from 3 to 4 and $b$ has a value from 0 to 1.

7. A silane that is represented by the structural formula:

$$C_6H_4(\overset{O}{\overset{\|}{C}}NH(CH_2)_4\overset{CH_3}{\underset{|}{\underset{|}{Si}}}-OC_2H_5)_2$$
$$\phantom{C_6H_4(\overset{O}{\overset{\|}{C}}NH(CH_2)_4}OC_2H_5$$

8. A compound that is represented by the structural formula:

$$\begin{array}{c}\overset{O}{\|}\\CH\overset{}{C}-NH(CH_2)_3Si(OC_2H_5)_3\\\|\\O\\\overset{\|}{C}H\overset{}{C}-NH(CH_2)_3Si(OC_2H_5)_3\end{array}$$

9. A siloxane containing at least one group represented by the formula:

$$M''''-\overset{O}{\overset{\|}{C}}-R-\overset{O}{\overset{\|}{C}}-NH-(CH_2)_a\overset{X_c}{\underset{|}{Si}}O_{\frac{3-c}{2}}$$

wherein $c$ has a value from 0.1 to 1.0, $M''''$ is a member selected from the group consisting of the halogen atoms and the OR' groups, X is an alkoxy group, R is a member selected from the group consisting of the alkylene groups, the arylene groups, the alkenylene groups and the divalent heterocyclic rings, said heterocyclic rings being composed of carbon and at least one member selected from the group consisting of the oxygen, sulfur and nitrogen atoms, R' is a member selected from the group consisting of the aryl groups and the alkyl groups and $a$ is an integer that has a value of at least 3.

10. A process for producing an organosilicon acylamino compound selected from the group consisting of (1) acylaminoalkylalkoxysilanes represented by the formula:

$$M''-\overset{O}{\overset{\|}{C}}-R-\overset{O}{\overset{\|}{C}}-NH-(CH_2)_a\overset{R''_b}{\underset{|}{Si}}X_{3-b}$$

wherein $M''$ is a member selected from the group consisting of the hydroxyl group, the halogen atoms, the OR' groups, and the $$-NH(CH_2)_a\overset{R''_b}{\underset{|}{Si}}X_{3-b}$$

groups, R' is a member selected from the group consisting of the aryl groups and the alkyl groups, R is a member selected from the group consisting of the alkylene groups, the arylene groups, the alkenylene groups and the divalent heterocyclic rings, said heterocyclic rings being composed of carbon and at least one member selected from the group consisting of the oxygen, sulfur and nitrogen atoms, R'' is a member selected from the group consisting of the aryl groups, the alkyl groups and the aralkyl groups, X is an alkoxy group, $a$ is an integer that has a value of at least 3 and $b$ is an integer that has a value from 0 to 2, and (2) acylaminoalkylalkoxysiloxanes containing at least one group represented by the formula:

$$M''''-\overset{O}{\overset{\|}{C}}-R-\overset{O}{\overset{\|}{C}}-NH-(CH_2)_a\overset{X_c}{\underset{|}{Si}}O_{\frac{3-c}{2}}$$

wherein $c$ has a value from 0.1 to 1.0, $M''''$ is a member selected from the group consisting of the halogen atoms and the OR' groups and X, R, R' and $a$ have the above-defined meanings, which process comprises (I) forming a mixture of (A) a compound containing an aminoalkylsilyl group selected from the group consisting of ($a$) aminoalkylalkoxysilanes represented by the formula:

$$H_2N(CH_2)_a\overset{R''_b}{\underset{|}{Si}}X_{3-b}$$

wherein R'', X, $a$ and $b$ have the above-defined meanings, and ($b$) aminoalkylsiloxanes represented by the formula:

$$H_2N(CH_2)_a\overset{X_c}{\underset{|}{Si}}O_{\frac{3-c}{2}}$$

wherein X, $a$ and $c$ have the above-defined meanings and (B) an organic dicarbonyl compound, said organic dicarbonyl compound being represented by the formula:

$$R(CO)_2M'$$

wherein R has the above-defined meaning and M' is a member selected from the group consisting of the oxygen atom, $(OH)_2$, $G_2$ where G is a halogen atom and $(OR')_2$ wherein R' has the above-defined meaning when an acylaminoalkylalkoxysilane is being produced, and said organic dicarbonyl compound being represented by the formula:

$$R(CO)_2M''$$

wherein $M''$ is a member selected from the group consisting of $G_2$ where G is a halogen atom and $(OR')_2$ where R' has the above-defined meaning and R has the above-defined meaning when an acylaminoalkoxysiloxane is being produced, and (II) maintaining the mixture at a temperature at which the compound containing the aminoalkylsilyl group and the organic dicarbonyl compound react to produce the organosilicon acylamino compound.

11. A process for producing an acylaminoalkylalkoxysilane represented by the formula:

$$M''-\overset{O}{\overset{\|}{C}}-R-\overset{O}{\overset{\|}{C}}-NH-(CH_2)_a\overset{R''_b}{\underset{|}{Si}}X_{3-b}$$

wherein $M''$ is a member selected from the group consisting of the hydroxyl group, the halogen atoms, the OR' groups, and the $$-NH(CH_2)_a\overset{R''_b}{\underset{|}{Si}}X_{3-b}$$

groups, R' is a member selected from the group consisting of the aryl groups and the alkyl groups, R is a member selected from the group consisting of the alkylene groups, the arylene groups, the alkenylene groups and the divalent heterocyclic rings, said heterocyclic rings being composed of carbon and at least one member selected from the group consisting of the oxygen, sulfur and nitrogen atoms, R" is a member selected from the group consisting of the aryl groups, the alkyl groups and the aralkyl groups, X is an alkoxy group, $a$ is an integer that has a value of at least 3 and $b$ is an integer that has a value from 0 to 2 which process comprises forming a mixture of an aminoalkylalkoxysilane represented by the formula:

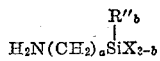

wherein R", X, $a$ and $b$ have the above-defined meanings and an organic dicarbonyl compound that is represented by the formula:

$$R(CO)_2M'$$

wherein R has the above-defined meaning and M' is a member selected from the group consisting of $(OH)_2$, $G_2$ where G is a halogen atom and $(OR')_2$ wherein R' has the above-defined meaning and maintaining the mixture at a temperature at which the aminoalkylalkoxysilane and the organic dicarbonyl compound react to produce the acylaminoalkylalkoxysilane.

12. The process of claim 11 wherein M" is a chlorine atom, $a$ has a value from 3 to 4, $b$ has a value from 0 to 1 and M' is a $Cl_2$ group.

13. The process of claim 11 wherein M" is a hydroxyl group, $a$ has a value from 3 to 4, $b$ has a value from 0 to 1 and M' is an $(OH)_2$ group.

14. The process of claim 11 wherein M" is an OR' group, $a$ has a value from 3 to 4, $b$ has a value from 0 to 1 and M' is an $(OR')_2$ group.

References Cited in the file of this patent

UNITED STATES PATENTS

| | | |
|---|---|---|
| 2,715,133 | Speier | Aug. 9, 1955 |
| 2,722,524 | Speck | Nov. 1, 1955 |
| 2,754,284 | Speck | July 10, 1956 |
| 2,762,823 | Speier | Sept. 11, 1956 |
| 2,832,754 | Jex et al. | Apr. 29, 1958 |

FOREIGN PATENTS

| | | |
|---|---|---|
| 1,065,545 | France | Jan. 13, 1954 |